United States Patent [19]
Brooke

[11] Patent Number: 5,261,030
[45] Date of Patent: Nov. 9, 1993

[54] REAL-TIME DIGITAL COMPUTER GRAPHICS PROCESSING METHOD AND APPARATUS

[75] Inventor: Kenneth R. Brooke, Arlington, Tex.

[73] Assignee: Hughes Training, Inc., Arlington, Tex.

[21] Appl. No.: 735,399

[22] Filed: Jul. 24, 1991

[51] Int. Cl.⁵ .............................. G06F 15/62
[52] U.S. Cl. ..................... 395/135; 395/133
[58] Field of Search .................. 395/119–122, 395/133–135, 150

[56] References Cited

U.S. PATENT DOCUMENTS

4,675,833  6/1987  Cheek et al. ................ 395/150
4,992,780  2/1991  Penna et al. ................ 395/122 X Primary Examiner—Gary V. Harkcom
Assistant Examiner—Almis Jankus
Attorney, Agent, or Firm—Wanda K. Denson-Low

[57] ABSTRACT

A visual simulation system (10') and method for digital computer graphics processing is described whereby the system (10') reduces the undesirable effects of aliasing on the digital computer images (59) rendered in the simulation. Real-Time Pixel Mixing (RTPM) is accomplished by processing each pixel ($P_f$) of a digital computer foreground image (60, 62) generated in real-time with the corresponding pixel ($P_b$) of a previously generated background image (64). The effect of the processing is to overlay the foreground image (60, 62) on the background image (64) and cause the pixels on the periphery of each object rendered in the foreground image (60, 62) to be color blended with the corresponding pixels of the background image (64) in such a manner as to "soften" the transition between the foreground (60, 62) and background (64) images. This results in a display image (59) having a detailed background with a sharp foreground and a smooth transition between the two which achieves the visual result desired by the visual simulation system (10').

18 Claims, 4 Drawing Sheets

REAL-TIME DIGITAL COMPUTER GRAPHICS PROCESSING METHOD AND APPARATUS

BACKGROUND OF THE INVENTION

1. Technical Field

This invention relates to digital computer graphics processing and is especially applicable for use in the image generators of visual simulation systems.

2. Discussion

The process of creating digital computer images for display in a visual simulation system from visual databases describing the mathematical representations, or geometric models, of objects, called pixelizing, inherently produces an undesirable effect on the digital computer image that is ultimately displayed for view. Known as "aliasing," its result is to cause mathematically continuous geometries to have a "stair-stepped" or "jagged" appearance on the output display device, or to be omitted altogether, thereby significantly reducing the visual realism of the digital computer image.

The phenomenon of aliasing results from the conversion of the continuous lines and polygons in a geometric model into a raster, which consists of a finite array of picture elements, also known as "pixels" or "raster elements," for display on a cathode-ray tube or other output display device. For example, when the geometric model of an object is converted into a digital computer image, the object's geometry is mapped onto the finite array of pixels making up the image. Each pixel is assigned a color value based upon the color of the particular geometry defined in the geometric model, such as a polygon, for example, which occupies or "owns" a majority of that pixel. Therefore, if two adjoining polygons each occupy some portion of a pixel, the pixel will represent only that geometry occupying the majority of that pixel. Also, if neither polygon occupies a majority of the pixel, the pixel will not represent either of the geometries, even though some portion of the pixel is, in fact, occupied by the polygons. Therefore, due to the fact that each pixel is finite and discreet, the digital computer image of the geometric model may appear to have "stair-stepped" edges or a "hole."

Further, when the object to be displayed changes its position or orientation in the visual database with successive frame updates of the digital computer image, i.e. the object is dynamic, the stair-stepped effect also is dynamic, thereby causing the motion of the object to appear to be distorted by occurrences of "crawling edges," "hopscotching points," and other abrupt artificial effects unrelated to the true motion of the object. Aliasing has been found to be extremely undesirable in a device such as visual simulation system not only because it reduces the realism of the simulation, but also because it is a distraction to the system's operator and detracts from the simulation task at hand.

Some digital computer graphics processors provide a feature called "anti-aliasing" which significantly diminishes the unacceptable effects of aliasing. Anti-aliasing is accomplished by dividing each pixel in a raster with an array of as many as 16 sub-pixels. The sub-pixels are then processed in the image generator in the traditional manner, with the average color of all of the sub-pixels being used to determine the color value to be assigned to the pixel. This method "softens" and "masks" jagged edges, however, it presents certain drawbacks. One is that anti-aliased lines and edges have the appearance of being slightly out of focus. Another is that the number of processes required by the image generator to generate a given display image is multiplied by the number of sub-pixels in each pixel. This could potentially increase the number of processes required by the display processing unit by as many as 16 times. The combination of these two drawbacks require that much faster and, consequently, much more expensive digital computer graphic processing components be used so that higher resolution rasters may be utilized to maintain a sharp display image and so that the display image may be generated with enough speed to create the appearance of smooth motion for the dynamic objects in the visual scene.

However, in some specialized visual simulation system applications, complete anti-aliasing is not cost efficient, although some anti-aliasing capability is desired. These visual simulation system applications are characterized as having visual scenes with a large static portion, such as a background fixed with respect to a given viewpoint, and a small dynamic portion, such as one or more moving foreground objects set against the static background. Examples of applications like the one just described are illustrated by certain flight training visual simulation systems which involve object detection, recognition, and identification, such as in air defense or air traffic control tower trainers.

SUMMARY OF THE INVENTION

According to the teachings of the present invention, a visual simulation system and method for digital computer graphics processing is described whereby the system reduces the undesirable effects of aliasing on the digital computer images rendered in the simulation. Real-Time Pixel Mixing (RTPM) is accomplished by processing each pixel of a digital computer foreground image generated in real-time with the corresponding pixel of a previously generated background image. The effect of the processing is to overlay the foreground image on the background image and cause the pixels on the periphery of each object rendered in the foreground to be color blended with the corresponding pixels of the background image in such a manner as to "soften" the transition between the foreground and background images. This results in a display image having a detailed background with a sharp foreground and a smooth transition between the two which achieves the visual result desired by the visual simulation system.

BRIEF DESCRIPTION OF THE DRAWINGS

The various advantages of the present invention will become apparent to one skilled in the art upon reading the following specification in which.

DESCRIPTION OF THE PREFERRED EMBODIMENT

It should be understood from the outset that while the present invention will be described primarily in connection with one specific example, this example is simply a best mode of currently practicing the invention and that other modifications can be made to this specific example without departing from the spirit and scope of the invention.

Figure 1:
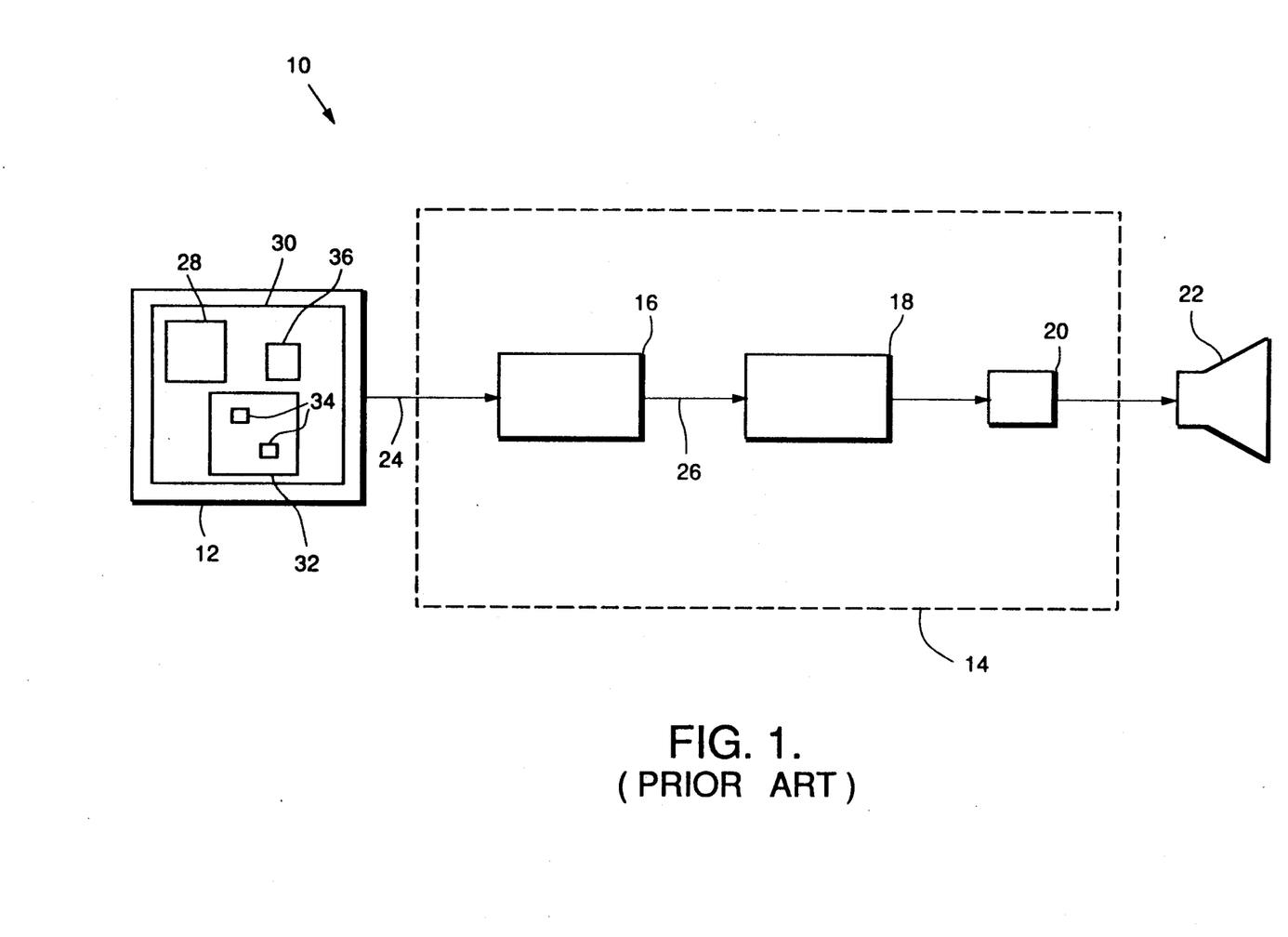
FIG. 1 illustrates a simplified block diagram showing the digital computer graphics processing components of a conventional visual simulation system.

Referring now to the drawings, a simplified block diagram showing the digital computer graphics processing components of a conventional visual simulation system (VSS) 10 is illustrated in FIG. 1. The digital computer graphics processing components of a conventional VSS 10 shown are well-known in the art and include a general purpose digital computer 12, an image generator (IG) 14 having a display processing unit (DPU) 16, a video display buffer 18, and a digital-to-analog converter 20, and an output display device 22. An image generation channel 24 running between the digital computer 12 and the DPU 16 services the IG 14, and a display channel 26 running between the DPU 16 and the video display buffer 18 services the output display device 22. In a conventional VSS 10, the digital computer graphics processing begins in the digital computer 12 which operates under the control of an application program 28 executing in its programmable memory 30. The application program 28 generates data for graphics processing in the IG 14. The IG 14 then interprets the data and, in turn, generates an output which is subsequently interpreted and displayed by the output display device 22 for physically representing each frame of the simulation.

For each frame of the simulation, the application program 28 executing in the digital computer 12 generates a set of data which describes a computer model corresponding to the physical environment that is to be simulated, such as an airfield and aircraft in an air traffic control tower trainer, for example. This set of data is commonly referred to in the art as a visual database 32. The visual database 32 defines the mathematical representations, or geometric models 34, that provide the relevant information about the descriptions and properties of the objects in that environment, and contains information about relationships among the objects. A single visual database 32 is capable of defining a plurality of geometric models 34 for a plurality of objects in the environment, including static objects, such as buildings, for example, and dynamic objects, such as aircraft.

In conjunction with the visual database 32, the application program also generates a display channel definition 36. The display channel definition 34 is a separate set of data which describes the viewing specifications, such as the look angle, field of view, and other descriptors, for example, according to which the visual database 32 will be viewed in that frame of the simulation. It is the display channel definition 36 that describes the viewing orientation of the visual database 32 so that the IG 14 can generate the appropriate digital computer image for each successive frame in the simulation.

The digital computer 12 then instructs the IG 14 to process the visual database 32 in accordance with the viewing specifications of the display channel definition 36. The IG 14, in performing its function of generating an output for display on the output display device 22, completes two tasks: rasterization and digital-to-analog conversion.

The first task of the IG 14 is to generate a digital computer image, also known as a raster, which renders the visual scene desired in the simulation. This task is performed by the DPU 16. The DPU 16 creates the raster by converting the visual database 32 as oriented by the display channel definition 36 into a finite array of discreet picture elements, called pixels. Each pixel is assigned a display color value which corresponds to the color of that portion of the visual database 32 which the pixel represents. The display color value is defined by three integer components, R, G, and B, each component representing one of the three primary colors red, green, and blue. This information is commonly referred to in the art as pixel data or RGB color component data. The RGB data output of the DPU 16 is then stored in the video display buffer 18. This process of converting the visual database 32 into the RGB data of a raster is well-known in the art by a variety of terms, including scan conversion, digitization, as well as rasterization.

The second task of the IG 14 is to generate a video signal that can be interpreted by the output display device 22 so that it may physically render the raster as a visible image. This task is accomplished by the digital-to-analog converter 20. The RGB data stored in the video display buffer 18 are processed by the digital-to-analog converter 20 and are transformed from digital data into an analog video signal that can be interpreted by the output display device 22. This process is well-known in the art as digital-to-analog conversion.

Finally, the output display device 22, such as a cathode-ray tube, for example, interprets the analog video signal and displays the raster. Digital computer graphics processing for each frame of the simulation in a conventional VSS 10 is accomplished in a period of time on the order of about one-sixtieth of a second.

It is well-known that the process of generating a digital computer image from a visual database 32 describing the geometric models 34 of objects to be rendered in the simulation inherently produces the undesirable effect of aliasing on the digital computer image that is generated. The result of aliasing is to cause mathematically continuous geometries to have a "stair-stepped" or "jagged" appearance on the output display device 22, or to be omitted altogether, thereby significantly reducing the visual realism of the digital computer image. The configuration of the present invention enables a VSS 10 to achieve a more realistic visual simulation by reducing the undesirable effects of aliasing on the digital computer images rendered in the simulation without the need for an expensive, high-speed image generator.

Figure 2:
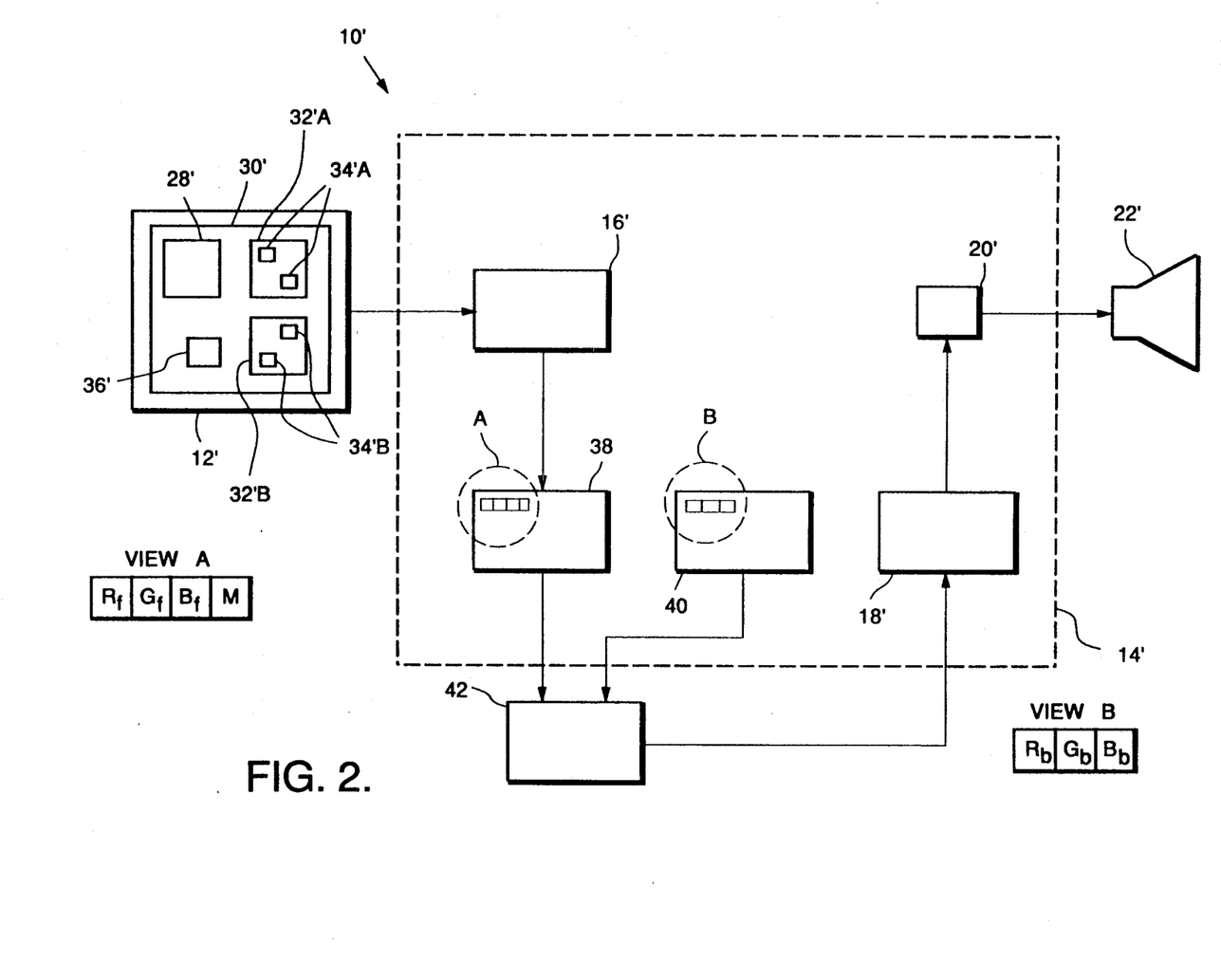
FIG. 2 shows a simplified block diagram illustrating the digital computer graphics processing components of a visual simulation system configured for use with the real-time pixel mixing of the present invention.

Turning now to FIG. 2, a simplified block diagram illustrating the digital computer graphics processing components o a VSS 10' configured for use with the real-time pixel mixing (RTPM) of the present invention is shown. Together with the digital computer graphics processing components of a conventional VSS 10 discussed previously, a VSS 10' configured for RTPM includes a foreground image buffer 38, a background image buffer 40, and a pixel mixer 42. Here, the processing flow of a conventional VSS 10 is supplemented with additional processing in the pixel mixer 42 which communicates with the IG 14'.

The foreground image buffer 38 is a video buffer that stores the RGB data output of the DPU 16'. In the present example, for each foreground pixel, $P_f$, in the raster generated by the DPU 16', the foreground image buffer 38 stores twenty-five bits of information. The first twenty-four bits correspond to the RGB data, eight bits each for the RGB color components $R_f$, $G_f$, and $B_f$. The final bit corresponds to a mix bit or mix switch M. The mix switch M is enabled or disabled under the control of the application program 28'. This is illustrated in View A of FIG. 2.

The background image buffer 40, in this example, is a video buffer that stores the twenty-four bits of RGB data for each background pixel, $P_b$, of a digital computer image, such as a landscape or skyscape, for example, to be used as the background image in the simulation. This is shown in View B of FIG. 2. Any method may be used to generate the RGB data of the background image, such as digital computer graphics processing or photodigitization, for example, however, the background image is pre-processed and is not generated by the IG 14' in real-time.

The pixel mixer 42 accepts the RGB data and mix switch setting for each pixel, $P_f$, in the foreground image buffer 38 and the RGB data for each pixel, $P_b$, in the background image buffer 40 as input and operates to generate each display pixel, $P_d$, in a composite digital computer image which is then stored in the video display buffer 18' for subsequent display on the output display device 22'.

FIGS. 2 through 5, illustrate real-time pixel mixing according to the preferred embodiment of the present invention.

As shown in FIG. 2, the application program 28' operates in the programmable memory 30' of the digital computer and generates two separate visual databases 32'A, 32'B for each frame in the simulation. Each visual database 32' is generated by the application program 28' in a well-known manner, however, each visual database 32'A, 32'B describes a different embodiment of the objects represented in the simulation. That is, each visual database 32'A, 32'B defines a different geometric model 34'A, 34'B for each object in the simulation. The first visual database 32'A defines, for each object represented in the simulation, a first geometric model or mix model 34'A that is a slightly enlarged, limited detail silhouette of the object. The second visual database 32'B, however, defines, for each object represented in the simulation, a second geometric model or parent model 34'B that is an accurately scaled and finely detailed representation of the object. Once generated, the two visual databases 32'A, 32'B are sequentially processed through the DPU 16' according to the display channel definition 36' and are converted into a single digital computer foreground image which is stored in the foreground image buffer 38.

The first visual database 32'A is processed by the DPU 16' in a well-known manner thereby generating a first digital computer foreground image corresponding to the mix models 34'A the first visual database 32'A describes. The pixels of the first foreground image are then stored in the foreground image buffer 38 and the mix switch M associated with each pixel is enabled. Next, the second visual database 32'B is processed by the DPU 16' thereby generating a second digital computer foreground image corresponding to the parent models 34'B described by the second visual database 32'B. The pixels of the second foreground image are also stored in the foreground image buffer 38 and, therefore, cause some of the pixels of the first foreground image that are already stored in the foreground image buffer 38 to be overwritten and replaced. In addition, the mix switch M associated with each pixel of the second foreground image is disabled.

It can be appreciated that the pixels of the second foreground image define a subset of the pixels of the first foreground image, since the first foreground image renders the mix models 34'A which are enlarged representations of the objects in the simulation, whereas the second foreground image renders the parent models 34'B which are accurately scaled. Therefore, the digital computer foreground image that is stored in the foreground image buffer 38 after the DPU 16' has processed both the first and second visual databases 32'A, 32'B corresponds to the pixels representing each mix model 34'A of the first foreground image, with their associated mix switches M enabled, overwritten by the pixels representing each parent model 34'B of the second foreground image, with their associated mix switches M disabled.

Figure 3:
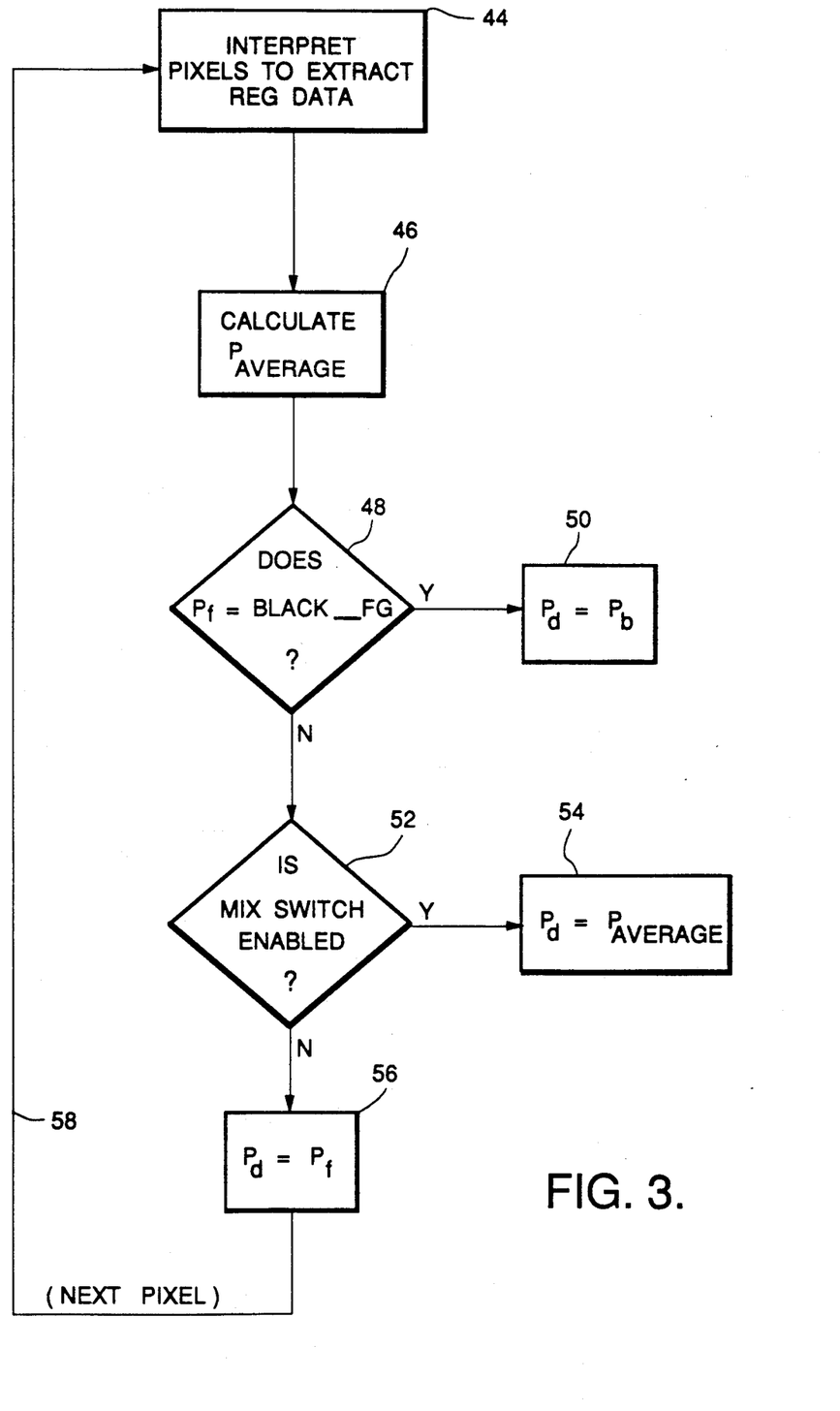
FIG. 3 shows a simplified flow chart of the operation of the real-time pixel mixing of the present invention.

At this point, the RTPM of the present invention is executed. FIG. 3 shows a simplified flow chart of the operation of the pixel mixer 42 in the present invention. The pixel mixer 42 sequentially processes the pixels of the foreground image with the corresponding pixels of the background image so as to create a composite image for display in the VSS 10' by effectively overlaying the foreground image on the background image and causing the pixels on the periphery of each object rendered in the foreground image to be color blended with the background image in such a manner as to reduce the effects of aliasing on the display image.

The first operation 44 of the pixel mixer 42 is to interpret a foreground pixel, $P_f$, and the corresponding background pixel, $P_b$, to extract their RGB color components $R_f$, $G_f$, and $B_f$ and $R_b$, $G_b$, and $B_b$. The next step 46 of the pixel mixer 42 is to calculate the average of the foreground and background pixels, $P_{Average}$. $P_{Average}$ is calculated by summing the respective RGB color components of each pixel and dividing to obtain $R_{Average}$, $G_{Average}$, and $B_{Average}$. The third step 48 of the pixel mixer 42 is to compare the foreground pixel, $P_f$, with a constant pixel, $P_{BLACK-FG}$, which is defined by RGB color components having values of $R_{BLACK-FG} = G_{BLACK-FG} = B_{BLACK-FG} = 0$. This operation determines the presence of color in the foreground pixel. The final operation of the pixel mixer 42 is to generate a display pixel, $P_d$. The value of the display pixel, $P_d$, is determined according to the following logic. If $P_f$ is equal to $P_{BLACK-FG}$, then the pixel mixer 42 outputs 50 a display pixel, $P_d$, equal to the background pixel, $P_b$. If $P_f$ is not equal to $P_{BLACK-FG}$, then the pixel mixer 42 interprets 52 the mix switch M of the foreground pixel, $P_f$, to determine its setting. If the mix switch M is enabled, the pixel mixer 42 outputs 54 a display pixel, $P_d$, equal to $P_{Average}$. If the mix switch M is disabled, the pixel mixer 40 outputs 56 a display pixel, $P_d$, equal to the foreground pixel, $P_f$.

The pixel mixer 42 continues to process each pair of foreground and background pixels $P_f$, $P_g$ until all the pixels in the respective image buffers 38, 40 have been processed. The time required for the pixel mixer 42 to perform the entire RTPM function is on the order of one pixel clock cycle or about one sixtieth of a second.

As the output of the pixel mixer 42, $P_d$, is generated, it is stored in the video display buffer 18' and is then converted into an analog video signal by the digital-to-analog converter 20' in a well-known manner for subsequent display on the output display device 22'.

Figure 4:
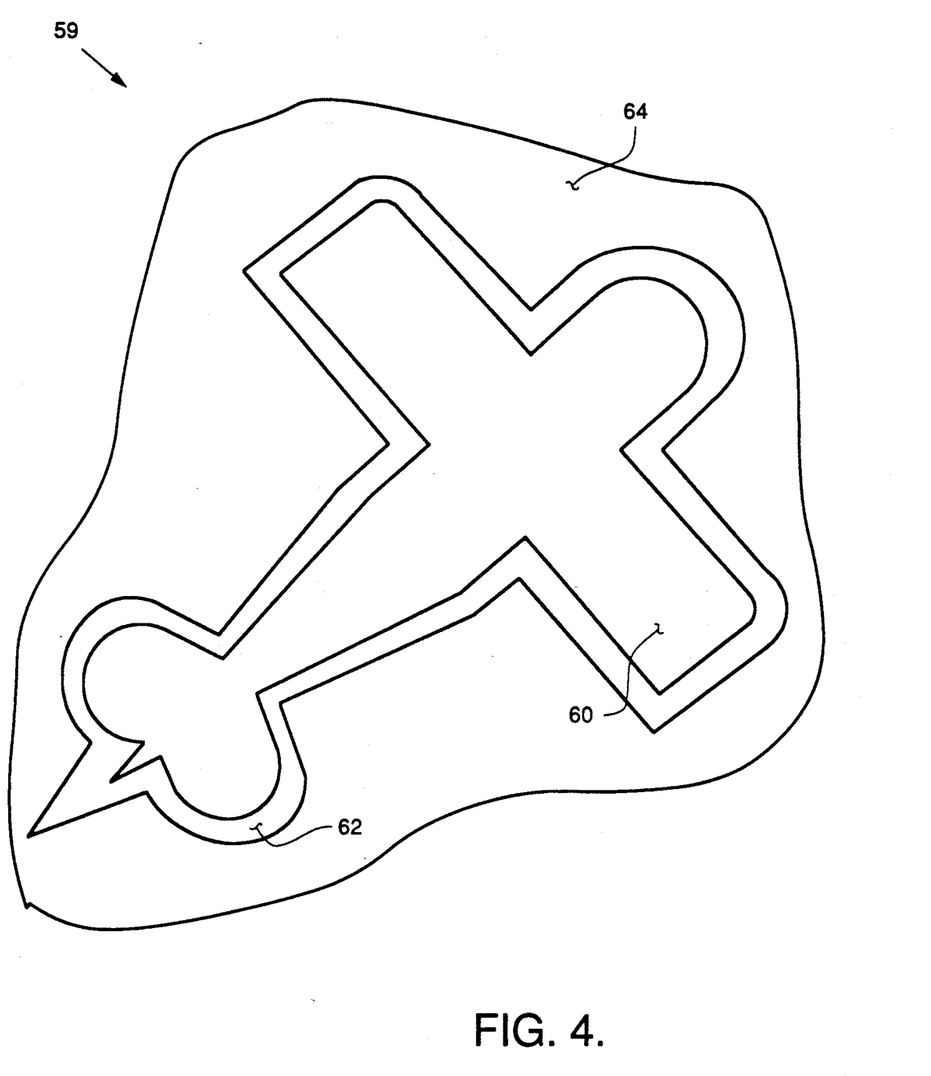
FIG. 4 shows a portion of the resultant visual output displayed on the output display device of a visual simulation system configured for use with the real-time pixel mixing of the present invention.

Finally, FIG. 4 shows a portion of the resultant visual output 59 displayed on the output display device 22' of a VSS configured for RTPM. The parent model foreground image 60 is outlined by the mix model foreground image 62. Both of the foreground images 60, 62 are overlayed onto the background image 64. The mix model foreground image 62 has been color blended with the background image 64 so as to smooth the transition between the parent model foreground image 60 and the background image 64.

The VSS and method for real-time pixel mixing of the present invention is expected to reduce the undesirable effects of aliasing on the digital computer graphics images of computer generated models in visual simulation systems. In addition, the present invention will eliminate the need for expensive, high speed, digital computer graphics processors in this application because full anti-aliasing of the display raster is not required. Further, the full processing power of the visual simulation system image generator may be devoted to generating the foreground image, thereby achieving the frame update rate necessary for a realistic simulation. In essence, the present invention enables a relatively low cost visual simulation system to possess many of the apparent features of a high cost, full-feature system.

Various other advantages and modifications will become apparent to one skilled in the art after having the benefit of studying the teachings of the specification, the drawings, and the following claims.

What is claimed is:

1. A visual simulation system for digital computer graphics processing, comprising:
   a) means for generating a first and second visual database and a display channel definition for each of a plurality of frames in a visual simulation, wherein the means for generating a first and second visual database comprises:
      means for generating a first visual database defining, for each object represented in the simulation, a first geometric model that is an enlarged silhouette of the object, and
      means for generating a second visual database defining, for each object represented in the simulation, a second geometric model that is a scaled and detailed representation of the object;
   b) means for processing the first and second visual databases according to the display channel definition and generating a single digital computer foreground image;
   c) means for providing a digital computer background image; and
   d) means for processing each of a plurality of pixels of the foreground image with each of a plurality of corresponding pixels of the background image for generating a composite digital computer image for display in the simulation;
   whereby the system reduces the effects of aliasing on the digital computer images displayed in the simulation.

2. A visual simulation system for digital computer graphics processing, comprising:
   a) means for generating a first and second visual database and a display channel definition for each of a plurality of frames in a visual simulation;
   b) means for processing the first and second visual databases according to the display channel definition and generating a single digital computer foreground image, wherein the means for processing the first and second visual databases according to the display channel definition and generating a single digital computer foreground image comprises:
      means for converting the first visual databases into a first digital computer foreground image having a finite number of pixels, each pixel being defined by RGB color component data;
      means for storing the pixels of the first image in an array;
      means for providing a separate mix switch for each storage location in the array;
      means for enabling the mix switches corresponding to the storage locations of the pixels of the first image;
      means for converting the second visual database into a second digital computer foreground image having a finite number of pixels, each pixel being defined by RGB color component data;
      means for replacing, in the storage array of the first image, the appropriate pixels of the first image with the pixels of the second image; and
      means for disabling the mix switches corresponding to the storage locations of the pixels of the second image;
   c) means for providing a digital computer background image; and
   d) means for processing each of a plurality of pixels of the foreground image with each of a plurality of corresponding pixels of the background image for generating a composite digital computer image for display in the simulation;
   whereby the system reduces the effects of aliasing on the digital computer images displayed in the simulation.

3. A visual simulation system for digital computer graphics processing, comprising:
   a) means for generating a first and second visual database and a display channel definition for each of a plurality of frames in a visual simulation;
   b) means for processing the first and second visual databases according to the display channel definition and generating a single digital computer foreground image;
   c) means for providing a digital computer background image; and
   d) means for processing each of a plurality of pixels of the foreground image with each of a plurality of corresponding pixels of the background image for generating a composite digital computer image for display in the simulation, wherein the means for processing each of a plurality of pixels of the foreground image with each of a plurality of corresponding pixels of the background image comprises:
      means for interpreting a pixel of the foreground image, $P_f$, and the corresponding pixel of a background image, $P_b$, to extract the pixel RGB color component data;
      means for calculating the average pixel, $P_{average}$, corresponding to the foreground and background pixels;
      means for comparing the foreground pixel with a constant pixel;
      means for interpreting the setting of the mix switch corresponding to the foreground pixel;
      means for generating a display pixel, $P_d$, for display in the simulation; and means for repeating the steps for each pair of pixels of the foreground and background images;

whereby the system reduces the effects of aliasing on the digital computer images displayed in the simulation.

4. The visual simulation system of claim 3 wherein the means for calculating the average pixel comprises:
means for averaging the respective RGB color components of the foreground and background pixels to determine $R_{Average}$, $G_{Average}$, and $B_{Average}$; and
means for defining $P_{Average}$ as having the RGB color component data $R_{Average}$, $G_{Average}$, and $B_{Average}$.

5. The visual simulation system of claim 3 wherein the means for comparing the foreground pixel with a constant pixel comprises:
means for comparing the RGB color component data of the foreground pixel, $R_f$, $G_f$, and $B_f$, with the RGB color component data of a constant pixel, $P_{BLACK-FG}$, defined as $R_{BLACK-FG} = G_{BLACK-FG} = B_{BLACK-FG} = 0$.

6. The visual simulation system of claim 3 wherein the means for generating the display pixel comprises:
means for setting the value of the display pixel, $P_d$, equal to the background pixel, $P_b$, if the foreground pixel, $P_f$, is equal to the constant pixel, $P_{BLACK-FG}$;
means for setting the value of the display pixel, $P_d$, equal to the value of the average pixel, $P_{Average}$, if the foreground pixel, $P_f$, is not equal to the constant pixel, $P_{BLACK-FG}$, and the mix switch corresponding to the foreground pixel is enabled; and
means for setting the value of the display pixel, $P_d$, equal to the value of the foreground pixel, $P_f$, if the foreground pixel, $P_f$, is not equal to the constant pixel, $P_{BLACK-FG}$, and the mix switch corresponding to the foreground pixel is disabled.

7. A visual simulation system for digital computer graphics processing, comprising:
a) means for generating a first and second visual database and a display channel definition for each of a plurality of frames in a visual simulation;
b) means for processing the first and second visual databases according to the display channel definition and generating a single digital computer foreground image;
c) means for providing a digital computer background image; and
d) means for processing each of a plurality of pixels of the foreground image with each of a plurality of corresponding pixels of the background image for generating a composite digital computer image for display in the simulation, wherein the means for processing each of a plurality of pixels of the foreground image with each of a plurality of corresponding pixels of the background image operates within the time span of a single pixel clock cycle;
whereby the system reduces the effects of aliasing on the digital computer images displayed in the simulation.

8. A visual simulation system for digital computer graphics processing, comprising:
a) means for generating a first and second visual database and a display channel definition for each of a plurality of frames in a visual simulation;
b) means for processing the first and second visual databases according to the display channel definition and generating a single digital computer foreground image;
c) means for providing a digital computer background image; and
d) means for processing each of a plurality of pixels of the foreground image with each of a plurality of corresponding pixels of the background image for generating a composite digital computer image for display in the simulation;
wherein the system is a training visual system which involves object detection, recognition, and identification,
whereby the system reduces the effects of aliasing on the digital computer images displayed in the simulation.

9. The visual simulation system of claim 8 wherein the system is characterized as having a dynamic foreground image and a static background image.

10. A method of digital computer graphics processing in a visual simulation system, comprising the steps of:
a) generating a first and second visual database and a display channel definition for each of a plurality of frames in a visual simulation, wherein step (a) comprises:
generating a first visual database defining, for each object represented in the simulation, a first geometric model that is an enlarged silhouette of the object; and
generating a second visual database defining, for each object represented in the simulation, a second geometric model that is a scaled and detailed representation of the object;
b) processing the first and second visual databases according to the display channel definition and generating a single digital computer foreground image;
c) providing a digital computer background image; and
d) processing each of a plurality of pixels of the corresponding foreground image with each of a plurality of corresponding pixels of the background image for generating a composite digital computer image for display in the simulation;
whereby to reduce the effects of aliasing on the digital computer images displayed in the simulation.

11. A method of digital computer graphics processing in a visual simulation system, comprising the steps of:
a) generating a first and second visual database and a display channel definition for each of a plurality of frames in a visual simulation;
b) processing the first and second visual databases according to the displaychannel definition and generating a single digital computer foreground image, wherein step (b) comprises:
converting the first visual database into a first digital computer image having a finite number of pixels, each pixel being defined by RGB color component data
storing the pixels of the first image in an array;
providing a separate mix switch for each storage location in the array;
enabling the mix switches corresponding to the storage locations of the pixels of the first image;
converting the second visual database into a second digital computer image having a finite number of pixel, each pixels being defined by RGB color component data;
replacing, in the storage array of the first image, the appropriate pixels of the first image with the pixels of the second image; and disabling the mix switches corresponding to the storage locations of the pixels of the second image; whereby to produce a single digital computer foreground image;

c) providing a digital computer background image; and d) processing each of a plurality of pixels of the corresponding foreground image with each of a plurality of corresponding pixels of the background image for generating a composite digital computer image for displaying the simulation;

whereby to reduce the effects of aliasing on the digital computer images displayed in the simulation.

12. A method of digital computer graphics processing in a visual simulation system, comprising the steps of:

a) generating a first and second visual database and a display channel definition for each of a plurality of frames in a visual simulation;

b) processing the first and second visual databases according to the display channel definition and generating a single digital computer foreground image;

c) providing a digital computer background image; and d) processing each of a plurality of pixels of the corresponding foreground image with each of a plurality of corresponding pixels of the background image for generating a composite digital computer image for display in the simulation, whereby step (d) comprises:

interpreting a pixel of the foreground image, $P_f$, and the corresponding pixel of the background image, $P_b$, to extract the pixel RGB color component data, calculating the average pixel, $P_{average}$, corresponding to the foreground and background pixels;

comparing the foreground pixel with a constant pixel;

interpreting the setting of the mix switch corresponding to the foreground pixel;

generating a display pixel, $P_d$, for display in the simulation; and repeating the steps for each pair of pixels of the foreground and background images;

whereby to reduce the effects of aliasing on the digital computer images displayed in the simulation.

13. The method of claim 12 wherein the calculating of the average pixel comprises:

averaging the respective RGB color components of the foreground and background pixels to determine $R_{Average}$, $G_{Average}$, and $B_{Average}$; and defining $P_{Average}$ as having the RGB color component data $R_{Average}$, $G_{Average}$, and $B_{Average}$.

14. The method of claim 12 wherein the comparing of the foreground pixel with a constant pixel comprises:

comparing the RGB color component data of the foreground pixel, $R_f$, $G_f$, and $B_f$, with the RGB color component data of a constant pixel, $P_{BLACK-FG}$, defined as $R_{BLACK-FG}=G_{BLACK-FG}=B_{BLACK-FG}=O$.

15. The method of claim 12 wherein the generating of the display pixel comprises:

setting the value of the display pixel, $P_d$, equal to the background pixel, $P_b$, if the foreground pixel, $P_f$, equals the constant pixel, $P_{BLACK-FG}$; else setting the value of the display pixel, $P_d$, equal to the value of the average pixel, $P_{Average}$, if the mix switch for the foreground pixel is enabled; else setting the value of the display pixel, $P_d$, equal to the value of the foreground pixel, $P_f$, if the mix switch for the foreground pixel is disabled.

16. A method of digital computer graphics processing in a visual simulation system, comprising the steps of:

a) generating a first and second visual database and a display channel definition for each of a plurality of frames in a visual simulation;

b) processing the first and second visual databases according to the display channel definition and generating a single digital computer foreground image;

c) providing a digital computer background image; and d) processing each of a plurality of pixels of the corresponding foreground image with each of a plurality f corresponding pixels of the background image for generating a composite digital computer image for display in the simulation, wherein step (d) is accomplished within the time span of a single pixel clock cycle;

whereby to reduce the effects of aliasing on the digital computer images displayed in the simulation.

17. A method of digital computer graphics processing in a visual simulation system, comprising the steps of:

a) generating a first and second visual database and a display channel definition for each of a plurality of frames in a visual simulation;

b) processing the first and second visual databases according to the display channel definition and generating a single digital computer foreground image;

c) providing a digital computer background image; and d) processing of a plurality of pixels of the corresponding foreground image with each of a plurality of corresponding pixels of the background image for generating a composite digital computer image for display in the simulation, wherein the visual simulation system is a training visual system which involves object detection, recognition, and identification;

whereby to reduce the effects of aliasing on the digital computer images displayed in the simulation.

18. The method of claim 17 wherein the visual simulation system is characterized as having a dynamic foreground image and a static background image.

* * * * *